April 29, 1952        M. LINDELL        2,594,663
SPEED CONTROL APPARATUS
Filed July 15, 1949
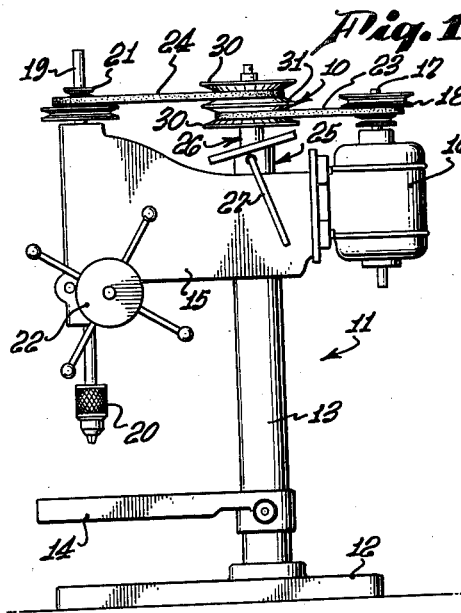
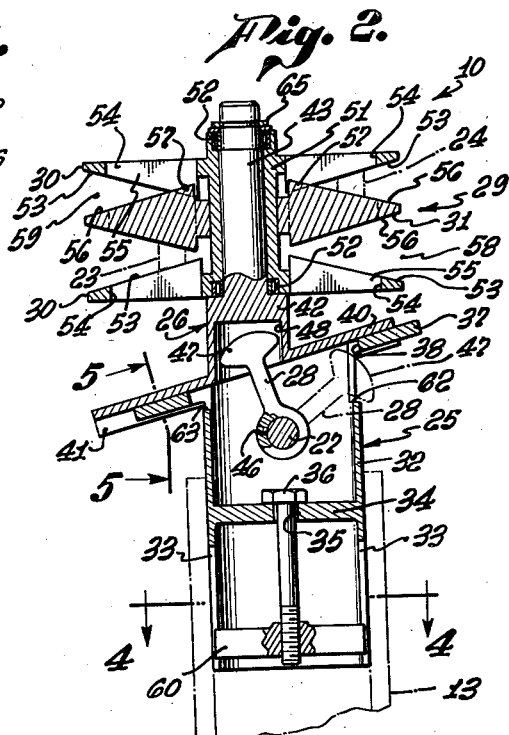
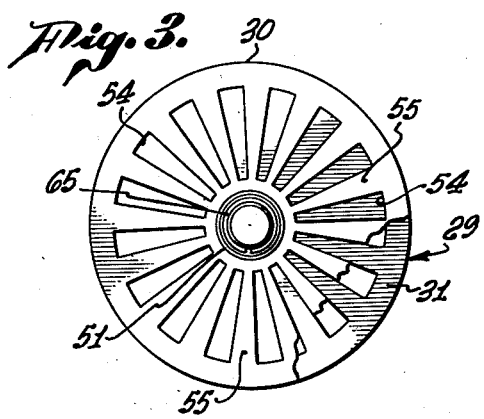
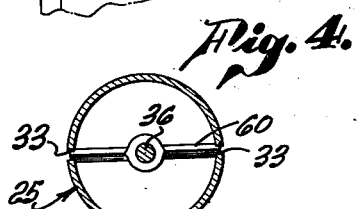
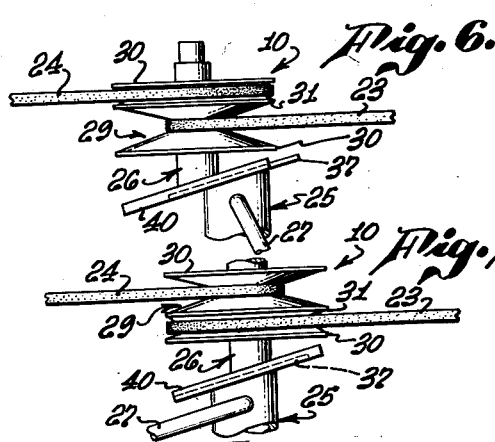
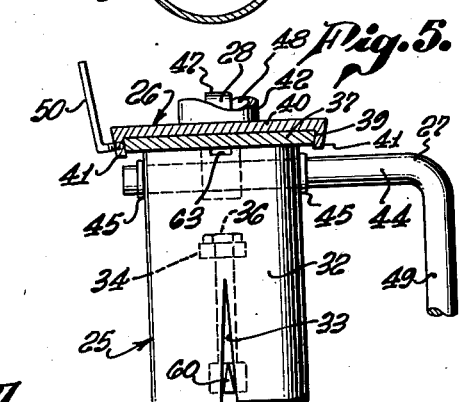
INVENTOR.
MARTIN LINDELL,
BY
ATTORNEY.

Patented Apr. 29, 1952

2,594,663

UNITED STATES PATENT OFFICE 2,594,663

SPEED CONTROL APPARATUS

Martin Lindell, West Los Angeles, Calif.

Application July 15, 1949, Serial No. 104,873

3 Claims. (Cl. 74—230.17)

This invention relates generally to improved speed control apparatus, and concerns particularly novel devices for controllably varying the rotational speed of a driven shaft. In certain of its aspects, the invention is especially directed toward the provision of apparatus for controlling the chuck speed of a conventional drill press.

Various devices in the past have controlled the output speed of a belt and pulley type drive by employing one or more axially expansible sheaves having tapered side walls relatively movable together and apart in a manner varying the effective sheave diameter. Devices embodying the present invention employ this expansible sheave principle and preferably form in effect a pair of such sheaves rotatable together in opposed and balanced relation for complementary opening and closing movement. That is, the opening movement of one sheave effects corresponding closing movement of the other in a manner multiplying the resulting speed variation over and above that obtainable with a single expansible sheave.

The opening or closing movement of an expansible sheave generally involves the movement of only one of its side walls, the other being retained against axial displacement. Obviously, such movement of only one wall, unless compensated, would displace the center of the belt receiving groove in a manner destroying its accurate alinement with the belt. For this reason, an important object of the invention is to provide compensating means for automatically maintaining an expansible sheave assembly, in all of its speed settings, correctly alined with the engaging belt.

It is contemplated that the output speed of the apparatus may be controlled by bodily displacement of the sheave assembly relative to the driving and driven belts. In this connection, a particular feature of the invention involves the mounting of the assembly for its speed controlling movement along a predetermined angularly disposed course designed to maintain the sheave grooves in their correctly alined positions at all times.

To permit use of the present expansible sheave arrangement with relatively narrow belts, I preferably form the movable side walls to interfit in a manner permitting their displacement to axially overlapping positions.

The above and further features and objects of the present invention will be better understood from the following detailed description of the typical embodiment illustrated in the accompanying drawing, in which:

Fig. 1 is a side elevation of the speed control apparatus applied to a conventional drill press;

Fig. 2 is an enlarged vertical section through the speed control apparatus of Fig. 1;

Fig. 3 is an enlarged plan view of the sheave assembly, showing especially the upper sheave section or disc;

Fig. 4 is a horizontal section taken on line 4—4 of Fig. 2 and showing the mounting tube with its spreader wedge;

Fig. 5 is a section through the adjustable mounting taken on line 5—5 of Fig. 2; and Figs. 6 and 7 are side elevations showing the speed control assembly positioned for two different speeds.

Referring first to Fig. 1, the illustrated speed control assembly 10 is applied to a conventional drill press 11, including the usual base 12, vertically extending tubular frame member 13, vertically movable table 14, and upper body 15. At one side, body 15 carries a motor 16, whose upwardly projecting shaft 17 carries the usual cone sheave 18. At its other side, the body carries a vertically extending shaft 19, having the chuck 20 at its lower end and cone sheave 21 at its upper end. In the ordinary drill press installation, a single belt extends about sheaves 18 and 21 to transmit the motor rotation directly to shaft 19 and chuck 20. Any desired variation of the chuck speed can then be accomplished only by movement of the belt between the various belt receiving grooves of the sheaves. With the present apparatus, on the other hand, I employ separate drive and driven belts 23 and 24, and vary the relative speeds of these belts by bodily displacement of the speed control assembly 10.

Assembly 10 comprises essentially a base 25 adapted for attachment to the drill press, a body or sheave mounting element 26 movably carried by base 25, a manual control for moving the body relative to the base and including handle 27 and handle operated lug 28, and the sheave structure 29 including a pair of outer sheave sections 30 and an inner section 31.

Base 25 has a depending tubular portion 32 of an external diameter to be received within the upper end of frame member 13 of the drill press. At its lower end, tubular portion 32 has a pair of diametrically opposed upwardly tapering slots 33, and above those slots contains a horizontal cross piece 34 having a central opening 35. Screw bolt 36 extends downwardly through opening 35 (see Fig. 2), and threadedly carries at its lower end a transversely extending upwardly tapering wedge element 60. The outer ends of element 60 are received within slots 33 to wedge the tubular portion 32 of the base outwardly against frame member 13 upon tightening of the bolt.

At its upper end, the base includes an essentially rectangular inclined plate 37 having a central opening 38 at the location of tubular portion 32. Body 26 has a lower similarly inclined plate portion 40 slidably received on plate 37. Plate 40 has a pair of depending inwardly tapered flanges 41 extending along its inclined edges and engageable with tapered edges 39 of plate 37 to retain and guide the body for essentially lateral movement at an angle to the horizontal corresponding to the inclination of the two plates. On the upper surface of plate 40, body 26 has an upwardly extending projection including a lower relatively large diameter portion 42 and an upper smaller diameter shaft portion 43 for carrying the sheave assembly.

Lateral movement of body 26 relative to the base, as permitted by the sliding engagement of plates 37 and 40, is effected by swinging movement L-shaped handle 27, whose horizontal arm 44 is mounted for rotation within suitable openings in the tubular portion 32 of the base. Rings 45, carried by handle arm 44 at either side of the base, retain the handle against axial displacement from the illustrated position. Within the base, arm 44 of the handle rigidly carries an upwardly projecting lug 28, which is located on the arm by set screw 46 and has an upper head 47 received within recess 48 in the under side of body 26. As will be understood, swinging movement of the depending handle arm 49 rotates arm 44 about its axis to swing lug 28 laterally. Such lateral displacement of the lug correspondingly displaces the body relative to base 25, as between the positions of Figs. 6 and 7. An opening 62 in one side of the depending portion of the base permits swinging movement of lug 28 to the downwardly retracted position shown in broken lines in Fig. 2, in which position body 26 is free for removal from the base. At its other side, the base has an opening 63 for partially receiving head 47 of the lug to permit maximum operating displacement of the lug in that direction. As seen in Fig. 5, one of the flanges 41 of plate 40 carries a set screw 50 engageable with the adjacent side 39 of plate 37 to retain the two plates in any desired relative setting.

Sheave assembly 29 includes a sleeve 51 rotatably mounted on shaft 43 by roller bearings 52 and axially retained by ring 65. Sleeve 51 rigidly carries a pair of axially spaced outer sheave sections or discs 30, and rotatably carries between these outer sections an inner section 31 adapted for axial movement along the sleeve and relative to the outer sections.

Each outer section has a radially tapered inner face 53, and contains a series of spaced radially extending openings 54 dividing it into a number of radially extending ribs 55. Inner section 31 has at its opposite sides, a pair of tapered faces 56 in opposed and axially spaced relation to faces 53 of the outer sections respectively to form a pair of belt receiving grooves 58 and 59. For a purpose to appear later, the angle formed between the axis of shaft 43 and each of the tapered faces 53 and 56 is equal to the angle formed between the axis and the plates 37 and 41.

The inner section has a series of radially extending openings corresponding to those of the outer sections and by virtue of which the various sections interfit upon movement together. This interfitting relation achieves the two purposes of, first, angularly interlocking the various sections for rotation together, and second, permitting movement of the inner section into such axially overlapping relation with the outer sections as to render possible the use of relatively narrow belts. As seen in Fig. 2, the inner section is of a thickness at its base greater than the distance between the two outer sections to in all positions be interlocked with one of those sections (as at 57 in Fig. 2).

In use, base 25 is first attached to the drill press by reception of its depending tubular portion 32 within vertical frame member 13, and is retained in the illustrated position by tightening of screw 36. Body 26 is then applied to the base by sliding reception of plate 40 on plate 47, after which belts 23 and 24 are passed at their outer ends about sheaves 18 and 21 respectively, and at their inner ends about grooves 58 and 59 of the speed control assembly. When body 26 is in the centered position of Fig. 1, inner sheave element 31 is midway between the outer elements 30 and the speed of the driven shaft 19 and chuck 20 corresponds substantially to that of motor shaft 17. When, however, element 26 is moved laterally in either direction by swinging movement of handle 27, the relatively stationary belts move the inner sheave disc 31 in the direction of one of the outer discs 30. For instance, upon leftward movement of the assembly to the position of Fig. 6, belt 23, which is retained against leftward movement by sheave 18, displaces inner section 31 upwardly relative to the outer sections to widen the lower groove 58 and narrower upper groove 59. Consequently, the effective diameter of the lower sheave groove is reduced and the effective diameter of the upper groove is increased, to materially increase the speed of shaft 19 over that of shaft 17. Similarly, the relative speed of shaft 19 may be decreased relative to that of the motor shaft by rightward movement of the sheave assembly, as to the position of Fig. 7.

As will be understood, if body 26 and the sheave assembly were moved directly horizontally in altering the speed ratio of the drive and driven shafts, the resulting vertical displacement of inner sheave section 31 would raise or lower the center planes of grooves 58 and 59 relative to the side sheaves 18 and 21. Consequently, the grooves of the control assembly would only be in correct horizontal alinement with sheaves 18 and 21 in a single position of the device. It is for this purpose that the sliding plates 37 and 40 are disposed at an angle to the axis of shaft 43 corresponding to the angle between that axis and the various tapered faces 53 and 56 of the sheave sections. By virtue of this relation, body 26 and outer section 30 are vertically displaced by any movement of plate 40 a distance exactly compensating for the vertical displacement of the inner section to thus maintain the grooves at all times alined with sheaves 18 and 21. As the sheave assembly is moved to the left between the positions of Figs. 1 and 6, inner section 31 moves axially upwardly relative to the outer sections in a manner tending to elevate the centers of the two grooves 58 and 59. At the same time, however, the leftward movement of the sheave assembly displaces outer sections 30 downwardly, by virtue of the inclination of plates 37 and 40, a distance exactly compensating for the elevation of inner section 31 to maintain the grooves in their original positions of centered alinement with the belts and side sheaves.

I claim:
1. Speed control apparatus comprising a base having a tubular mounting portion telescopically engageable with an interfitting support member to mount the base thereto, a body, means mounting said body to the base in proximate relation to said tubular portion thereof and for movement relative thereto along a path extending transversely of said tubular portion, a movable member mounted partially within said tubular portion of the base and operable to move said body relative to the base along said path, an actuating member having a portion at the outside of said tubular portion of the base and operatively connected to said movable member to control the operation thereof, a pair of sheave sections mounted to the body in axially spaced relation and for rotation about a common axis extending transversely of said path of movement of the body, said sections having radially tapered inner faces, a third sheave section rotatable between said outer sections and about their axis and having a pair of radially tapered faces at its opposite sides in opposed and spaced relation to said tapered faces of the pair of sections to form therewith a pair of annular belt receiving grooves, and means mounting said sections to the body for said rotation and for relative axial movement between the third section and said pair of sections as a unit to vary the relative sizes of said grooves.

2. Speed control apparatus comprising a base having a tubular mounting portion telescopically engageable with an interfitting support member to mount the base thereto, said base including a plate-like portion mounted about an end of said tubular portion and disposed at an angle less than 90° to the axis thereof, a body having a plate-like portion engaging and guided for sliding movement along said plate portion of the base to mount the body for movement relative to the base at said angle, said body including a shaft portion carried by and projecting from said plate-like portion of the body at a side thereof opposite the tubular portion of the base, said body containing a recess oppposite said end of the base and extending upwardly into said shaft portion thereof, a swinging arm mounted in said tubular portion of the base and having a swinging end received within said recess of the body to move the body relative to the base as guided by said plates, and an actuating member connected to the arm for movement therewith and projecting through the wall of said tubular portion of the body for operation at the outside thereof, a pair of sheave sections mounted about said shaft in axially spaced relation for rotation about the axis thereof, said sections having radially tapered inner faces, and a third sheave section rotatable about said shaft between said outer sections and having a pair of radially tapered faces at its opposite sides in opposed and spaced relation to said tapered faces of the pair of sections to form therewith a pair of annular belt receiving grooves, said shaft mounting the sections for relative movement between the third section and said pair of sections as a unit to vary the relative sizes of said grooves.

3. Speed control apparatus comprising a base having a tubular mounting portion telescopically receivable within a tubular member to mount the base thereto, said tubular portion of the base having longitudinal slits at a first end thereof permitting its radial expansion against the support member, means within said tubular portion of the base for wedging said first end thereof outwardly against the support to fasten it in fixed relation thereto, said base including a plate-like portion mounted about the second end of said tubular portion and disposed at an angle less than 90° to the axis of said tubular portion, a body having a plate-like portion engaging and guided for sliding movement along said plate portion of the base to mount the body for movement relative to the base along a path extending at said angle to the tubular portion thereof, said body being removable from the base by movement along said path, said body including a shaft portion carried by and projecting from said plate-like portion of the body at a side opposite said tubular portion of the base and extending axially in substantially the same direction as the axis of said tubular portion, a pair of sheave sections mounted about said shaft in axially spaced relation for rotation about the axis thereof, said section having radially tapered inner faces, a third sheave section rotatable about said shaft between said outer sections and having a pair of radially tapered faces at its opposite sides in opposed and spaced relation to said tapered faces of the pair of sections to form therewith a pair of annular belt receiving grooves, said third sheave section being movable axially relative to said pair of sections as a unit to vary the relative widths of said grooves, said body containing a recess opposite said second end of the tubular portion of the base and extending upwardly into said shaft portion thereof, a swinging arm mounted in said tubular portion of the base and having a swinging end received within said recess of the body to move the body relative to the base as guided by said plates, and an actuating member connected to the arm for movement therewith and projecting through the wall of said tubular portion of the body for operation at the outside thereof.

MARTIN LINDELL.

REFERENCES CITED

The following references are of record in the file of this patent:

UNITED STATES PATENTS

| Number | Name | Date |
|---|---|---|
| 377,510 | Biddison | Feb. 7, 1888 |
| 597,447 | Weil | Jan. 18, 1898 |
| 720,322 | Burkholder | Feb. 10, 1903 |
| 2,073,704 | Mitchell | Mar. 16, 1937 |
| 2,186,477 | Coddington | Jan. 9, 1940 |
| 2,237,511 | Tautz | Apr. 8, 1941 |
| 2,267,238 | Irwin | Dec. 23, 1941 |
| 2,293,230 | Waltz | Aug. 18, 1942 |
| 2,561,545 | Wallace | July 24, 1951 |

FOREIGN PATENTS

| Number | Country | Date |
|---|---|---|
| 115,271 | Sweden | Oct. 30, 1945 |